Patented Oct. 3, 1944

2,359,336

UNITED STATES PATENT OFFICE 2,359,336

POLYMERIZATION OF CYCLOPENTADIENE

Samuel G. Trepp, Swarthmore, Pa., assignor to The United Gas Improvement Company, a corporation of Pennsylvania No Drawing. Application July 22, 1938, Serial No. 220,703

3 Claims. (Cl. 260—92.6)

This invention pertains generally to the catalytic polymerization of unsaturated compounds such as cyclopentadiene and pertains particularly to the use of antimony chloride-organic solvent complexes and/or antimony bromide-organic solvent complexes as catalysts.

The invention will be described in connection with the production of cyclopentadiene polymer of a specific type. However, it is to be understood that it may be employed in the production of polymers of other types.

Cyclopentadiene may be polymerized into at least two broad types of polymers one of which is characterized by being soluble in solvents such as benzene, toluene, chloroform, carbon tetrachloride, and high flash naphtha, while the other is characterized by being insoluble in these solvents.

The polymerization is usually carried out while the cyclopentadiene is in solution in a solvent.

I have discovered that the soluble type of polymer may be produced with antimony chloride-organic solvent complexes and/or antimony bromide-organic solvent complexes by a careful control of the polymerizing reaction.

Examples of antimony chloride complexes and antimony bromide complexes are antimony chloride-benzene complex, antimony bromide-benzene complex, antimony chloride-toluene complex, antimony bromide-toluene complex, antimony chloride-diethyl ether complex, antimony bromide-diethyl ether complex, and complexes of antimony chloride or antimony bromide with dialkyl or aryl alkyl ethers generally.

The preparation of complexes of this character in general comprises adding antimony chloride (SbCl₃) or antimony bromide (SbBr₃), as the case might be, to the solvent with agitation. As a result, if a reaction takes place, a definite chemical compound is formed.

There are at least four factors which influence production of soluble polymer. These four factors are (1) temperature, (2) concentration of cyclopentadiene, (3) proportion of uniformly distributed catalyst and (4) time.

Generally speaking, and all other conditions remaining the same, it appears that there is a threshold temperature for the formation of insoluble polymer, and that at all temperatures below this threshold temperature the soluble polymer results. It is recognized, that high concentrations of cyclopentadiene and/or high proportions of uniformly distributed catalyst might place this theoretical threshold temperature below commercially obtainable temperature levels. However, for reasonable concentrations of cyclopentadiene and reasonable proportions of uniformly distributed catalyst a threshold temperature can be shown to exist for any given concentration of cyclopentadiene with any given proportion of uniformly distributed catalyst.

Also generally speaking, and all other conditions remaining the same, it appears that there is a threshold concentration of cyclopentadiene for the formation of insoluble polymer, and that at all concentrations below this threshold concentration the soluble form of polymer results. The term "concentration of cyclopentadiene" as used herein and in the claims specifies the percentage by weight of total cyclopentadiene, whether reacted or not, after all of the materials have been combined. It is recognized that inordinately high temperatures and/or inordinately high proportions of uniformly distributed catalyst may make the theoretical threshold concentration difficult of determination. However, for reasonable temperatures and reasonable proportions of uniformly distributed catalyst a threshold concentration of cyclopentadiene can be shown to exist at any given temperature with any given proportion of uniformly distributed catalyst.

Also generally speaking, and all other conditions remaining the same, and assuming that all of the materials have been combined, it appears that there is a threshold proportion of uniformly distributed catalyst for the formation of insoluble polymer, and that with all proportions below this threshold the soluble polymer results. In this connection experiments indicate quite clearly that catalyst is apparently used up during the polymerization of soluble polymer, and that additional catalyst is required to convert the soluble polymer into insoluble polymer. If the proportion of uniformly distributed catalyst is such that there is no catalyst available for the formation of insoluble polymer, none will be formed.

On the other hand, threshold proportions of catalyst are not required to polymerize all of the cyclopentadiene into the soluble polymer, although it will be recognized that a minimum proportion will be required for maximum yields.

It is recognized that inordinately high temperatures and/or inordinately high concentrations of cyclopentadiene may make the theoretical threshold proportion of uniformly distributed catalyst difficult of determination. However, for reasonable temperatures and reasonable concentrations of cyclopentadiene a threshold proportion of uniformly distributed catalyst can be shown to exist at any given temperature with any given concentration of cyclopentadiene.

Also generally speaking, and all other conditions remaining the same, it appears that there is a threshold reaction time for the formation of insoluble polymer, and that for all reaction times below this threshold reaction time the soluble polymer results. It is recognized that low temperatures, low concentrations of cyclopentadiene, and/or low proportions of uniformly distributed catalyst may cause this theoretical threshold reaction time to approach infinity. On the other hand, high temperatures, high concentrations of cyclopentadiene and/or high proportions of uniformly distributed catalyst may cause this theoretical threshold reaction time to approach zero. However, for reasonable temperatures, for reasonable concentrations of cyclopentadiene, and/or for reasonable proportions of uniformly distributed catalyst, a threshold reaction time can be shown to exist.

Threshold reaction time, however, differs from the other three factors in that when the threshold reaction time becomes more than one hour the time necessary to form insoluble polymer approaches infinity at a very rapid rate.

When threshold conditions are just exceeded insoluble polymer is formed but not exclusively. This results in a mixture of soluble and insoluble polymer.

When exceeding threshold conditions to a greater extent, however, insoluble polymer is formed exclusively. The band over which both soluble and insoluble polymers are formed varies in width with change in conditions. For instance this band decreases in width with increase in temperature.

Furthermore, the exact values of (1) temperature, (2) concentration of cyclopentadiene, (3) proportion of uniformly distributed catalyst and (4) time at which insoluble polymer begins to appear may vary somewhat with change in purity or source of cyclopentadiene or of catalyst or of solvent or a change in catalyst or solvent. However, the exact values may be readily determined by test.

The soluble polymer obtained varies in physical characteristics with the solvent used during the polymerization. For instance soluble polycyclopentadienes obtained by polymerizing cyclopentadiene by my new process in solvent naphtha, toluene, or benzene differ somewhat from each other as shown, for example, in the suitability of these polycyclopentadienes for coating metals for which they are unusually well suited. As an illustration, for certain purposes the benzene polymer is superior, the toluene polymer coming next but being, nevertheless, particularly well suited.

Accordingly, in the preparation of my polymerized cyclopentadiene a solution of cyclopentadiene in a chosen solvent such as toluene is employed.

I use as catalyst one or more antimony chloride-organic solvent complexes and/or antimony bromide-organic solvent complexes.

The complex catalysts are preferably employed in the form of suspensions, emulsions, or solutions in organic solvents of which benzene, toluene, solvent naphtha and petroleum naphtha are examples. Such suspensions, emulsions, or solutions are formed by adding the catalyst to the solvent followed by stirring. As an example, I find that a concentration of antimony chloride complex in toluene of 15% by weight of toluene is very suitable as a catalyst suspension although any other concentration or solvent suitable for the purpose may be employed.

The reactants should not be combined too rapidly since under such circumstances the reaction may proceed too violently and cause local overheating with the production of insoluble polymer, or undesirable color bodies, or both, which it is proposed to avoid.

While the catalyst may be added to the solution of cyclopentadiene particularly when the catalyst itself is in solution or in suspension in a solvent, I prefer to add the solution of cyclopentadiene to a suspension, emulsion or solution of the catalyst. This affords a more exact control of the amount and distribution of cyclopentadiene undergoing reaction at any one time. The reaction proceeds much more smoothly than when the catalyst is added to the cyclopentadiene. In the latter case no reaction appears to take place until a certain catalyst concentration is reached whereupon the reaction proceeds at a very high rate, and may get out of control.

In either event, however, the addition of one material to the other is preferably accompanied by thorough stirring which is preferably rapid to insure uniform distribution not only of the materials but also of temperature.

In addition the reaction is preferably carried out in apparatus capable of temperature control such as a jacketed vessel provided with an agitator.

A very effective control of the temperature of the reaction and of local superheating is afforded when the preferred procedure is followed.

As an example, the proportion of catalyst may conveniently be between 40% to 100% by weight of cyclopentadiene provided the temperature of the reaction is controlled and/or the concentration of cyclopentadiene is sufficiently low, thus avoiding the formation of insoluble polymer.

A proportion of catalyst of 80% by weight of the total cyclopentadiene present is found to be very convenient. It permits wide variation in temperatures and in concentrations of cyclopentadiene without danger of the formation of insoluble polymer. Furthermore, there is less likelihood of discoloration of the final product than if a larger proportion of catalyst were used.

Incidentally, it appears that the molecular weight of the resulting soluble polycyclopentadiene may be varied somewhat by varying the proportion of catalyst.

For instance, at all temperatures below 50° C. gel-like polymers are obtained when high proportions of catalyst are employed just below threshold conditions. The ease with which gel-like polymers are obtained increases with decrease in temperature. These polymers are completely soluble.

Incidentally, the formation of gel does not indicate definitely the presence of insoluble polymer as shown above.

Discoloration of the product appears to increase and decrease with increase and decrease in proportion of catalyst so that lower proportions of catalyst yield materials of lesser discoloration.

Temperatures above 100° C. are preferably avoided and it is recommended that great care be taken to keep the temperatures throughout the reaction below this point.

It is found that temperatures between −40° C. to 70° are suitable provided the reactants are sufficiently agitated or other steps taken to avoid local overheating. The preferred temperature range is between —40° C. and 30° C.

Incidentally, it appears that the molecular weight of the resulting soluble polycyclopentadiene may be varied somewhat by varying the temperature.

The increase in color due to increased reaction temperature is quite noticeable at 45° C. and becomes very pronounced as the reaction temperature approaches 100° C.

On the other hand, at 0° C. and even though the proportion of catalyst is fairly high, surprisingly light colored polymers are obtained. Low reaction temperatures are therefore indicated.

Cyclopentadiene solutions of any suitable concentration can be used, keeping in mind what has been said with respect to threshold conditions, although I more often employ concentrations of cyclopentadiene of from 20 to 30% by weight of total reactants.

Incidentally, it appears that the molecular weight of the resulting soluble polycyclopentadiene may be varied somewhat by varying the concentration of cyclopentadiene in the starting material.

Under the recommended conditions the polymer is formed in good yield and with a satisfactory color.

The chosen time for the reaction may vary considerably keeping in mind what has been said about threshold conditions. I find that for practicable purposes and good yields other conditions should be chosen such that the reaction time is somewhere in the neighborhood of one hour or more. This is borne out by the fact that the yield increases with reaction time up to a certain point. The time is, of course, preferably chosen to obtain good yields.

The following specific examples will serve to further illustrate the invention.

*Example 1*

81 grams of antimony chloride-diethyl ether complex are added to 100 grams of toluene with thorough agitation to form a suspension, emulsion or solution.

A mixture of 100 grams of cyclopentadiene and 50 grams of toluene are added to the suspension during the course of 10 minutes, the temperature ranging from 12° C. to 15° C. during the addition. The mixture is then agitated for five hours at 15° C., after which 75 grams of a 40% aqueous NaOH solution is added. This is followed by agitation for one hour.

225 grams of quicklime (CaO) are now added to the reaction mixture followed by agitation for an additional hour to dry the mix.

A suitable quantity of a filter aid is then added, and the mixture filtered. The filter cake is washed with toluene and the washings added to the product.

A solution containing 79 grams of soluble polycyclopentadiene is thus obtained.

Generally speaking, any other antimony chloride-organic solvent complex or any antimony bromide-organic solvent complex might be substituted in the foregoing example.

In the above specific example it will be noted that both the cyclopentadiene and the catalyst are in diluted form before addition. Furthermore, as pointed out above diluted cyclopentadiene is preferably added to diluted catalyst rather than vice versa to afford a better control of the speed and uniformity of the reaction and of the amount of heat evolved and consequently the type of polymer produced. The reaction runs smoother and is much more easily controlled on a large scale.

The addition of water to hydrolyze the catalyst makes it possible not only to completely remove the activity of the catalyst and thus stop the reaction at any point, but also makes it possible to remove the corrosive and discoloring acid constituents of the catalyst by a suitable alkali. The alkali is preferably added with the water used to hydrolyze the catalyst, although it may be added later if desired. The failure to substantially completely remove the catalyst and its hydrolysis products may be the cause of serious discoloration. The insoluble reaction products formed during the hydrolysis and neutralization remain behind on the filter leaving a highly purified filtrate.

*Example 2*

27 grams of antimony chloride-benzene complex are added to 150 grams of toluene with thorough agitation to form a suspension, emulsion or solution.

A mixture of 50 grams of cyclopentadiene and 50 grams of toluene are added to the suspension during the course of 8 minutes, the temperature ranging from 15 to 25° C. during the addition. The mixture is then agitated for an additional period of 5 hours at 15° C. 25 cubic centimeters of an 11% sodium carbonate solution is added. This is followed by agitation for one hour.

50 grams of quicklime (CaO) are now added to the reaction mixture followed by agitation for 16 hours.

100 grams of a suitable filter aid are then added and the mixture filtered.

A solution containing 33 grams of polycyclopentadiene is thus obtained.

The polymer may be used as such, or it may be concentrated in a vacuum still of suitable design to give a product containing any desired higher concentration of polycyclopentadiene including solid polycyclopentadiene, or it might be diluted to give any desired lower concentration, or a second solvent might be substituted such as a higher boiling solvent. This may be done either before or after concentration by adding the second solvent and distilling.

In the above examples the particular temperatures were chosen to control the physical properties such as viscosity and color of the product. It will be noted that at no time did the temperature exceed 100° C. or even 70° C. The manner of combining the reactants, constant agitation, and brine cooling made it possible to prevent local overheating, and the formation of insoluble polymer.

In the above examples (1) temperature, (2) concentration of cyclopentadiene, (3) proportion of uniformly distributed catalyst, and (4) reaction time may be varied considerably in the production of soluble polymer having in mind what has been said with respect to threshold conditions. If it is found that insoluble polymer is obtained, one or more of the four conditions, namely (1) temperature, (2) concentration of cyclopentadiene, (3) proportion of catalyst, and (4) reaction time should be reduced until the soluble polymer is obtained.

Carrying out the polymerization in the presence of a solvent makes it possible to have any desired concentration of cyclopentadiene.

While in the above example no dilution of the product was required to facilitate hydrolysis and/or filtering, it is to be understood that dilution with a solvent may be employed, if desired, particularly in the case of highly viscous products.

Generally speaking, for the formation of soluble polymer to the exclusion of insoluble polymer and of extreme discoloration, temperatures should rarely exceed 100° C., and preferably should not exceed 70° C., concentrations of cyclopentadiene should rarely exceed 50% by weight of the total solution except possibly at low temperatures, and concentrations of uniformly distributed catalyst should rarely exceed 100% by weight of cyclopentadiene.

It should be kept in mind that there are for practical purposes minimum values for temperature, concentration of cyclopentadiene, proportion of catalyst and time, which practice will show ought to be exceeded to obtain reasonable yields. On the other hand, if the maximum values given in the previous paragraph for temperature, catalyst and cyclopentadiene were used simultaneously, insoluble polymer would be formed, even though the reaction time chosen were as short as good practice would permit.

It is by the observance of the preferred principles set forth herein that a quality product is produced in good yield.

While in the above specific examples toluene is used as a polymerization medium, it is to be understood that any other solvent may be substituted of which benzene, xylene, ethyl benzene, solvent naphtha, petroleum naphtha, carbon tetrachloride, decaline, triethylbenzene and ethylene dichloride are especially suitable. The products with benzene and toluene are preferred for specific uses as hereinafter referred to.

While the use of pure cyclopentadiene in solution in a suitable solvent simplifies the system from the standpoint of the number of components present, the invention might be applied to solutions of crude cyclopentadiene in various states of purity with various degrees of success depending upon the results desired.

Examples of crude cyclopentadiene are the cyclopentadiene containing fractions obtained in the distillation of tar, drip oil and medium and low temperature condensates resulting from subjecting manufactured city gas such as carburetted water gas, oil gas, or coal gas to refrigeration.

Although in the above particular description both reactants, namely, catalyst and unsaturated compound, are diluted prior to their admixture, it is to be understood that variations are possible. For instance, it is conceivable that all of the diluent may be first mixed with one of the reactants (either catalyst or unsaturated compound) and that the other reactant may be added in concentrated form, particularly if the principles set forth herein are closely observed. Or the larger part of the diluent may be added to one of the reactants so that the other is relatively concentrated. It is also conceivable that, with the exercise of extreme care and the closest adherence to the principles set forth herein, both reactants might possibly be employed in relatively concentrated form. Other variations are possible. When adding one liquid to another with agitation I find it convenient and often preferable to do this below the surface of one of the liquids.

Any other suitable alkali such as sodium hydroxide, sodium carbonate, sodium bicarbonate, magnesium hydroxide, an amine or other basic substance might be substituted for quicklime in the above specific examples, followed by a non-acidic drying agent such as $Na_2SO_4$, or soda lime. Both neutralization and drying is effected by CaO.

In case it is desired to form a highly concentrated solution of polycyclopentadiene, or to isolate it in solid form, it is not necessary to dry the solution after neutralization as the water present can be readily removed in the subsequent concentrating operation. The complete removal of insoluble material present, such as the neutralizing agent, is then effected by filtering the partially concentrated solution after the complete removal of the water present by distillation. After this step the solution can be further concentrated if desired.

The product may be used for many purposes, for instance for lacquers generally, for varnishes either alone or in admixture with other resins, for enamels, for paints, or in fact for coating compositions generally. It is ideally suited to the coating of metals, for instance, for the coating of food containers as described and claimed in copending application, Serial Number 174,011, filed November 11, 1937, by Newcomb K. Chaney. This is especially true of the products polymerized in benzene and toluene.

If desired, it is possible to obtain soluble polycyclopentadiene of higher viscosity or of otherwise changed characteristics by starting with a solution of polycyclopentadiene and stopping the reaction before threshold conditions are exceeded.

It is to be understood that the above specific examples are by way of illustration. Therefore, changes, omissions, additions, substitutions, and/or modifications might be made within the scope of the claims without departing from the spirit of the invention which is intended to be limited only as required by the prior art.

I claim:

1. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene one of a group consisting of hydrolyzable antimony chloride-organic solvent complexes and hydrolyzable antimony bromide-organic solvent complexes, said complex being previously formed by reacting the corresponding antimony halide with an organic solvent capable of reacting with said antimony halide to form said hydrolyzable complex; and preventing the polymerization of said cyclopentadiene from being effected entirely to benzene-insoluble polycyclopentadiene by thoroughly agitating the reaction mass while maintaining the reaction temperature below 100° C., the concentration of said cyclopentadiene below 50% by weight, and the proportion of catalyst to said cyclopentadiene below 100% by weight, and by stopping the reaction by inactivating said catalyst while benzene-soluble polycyclopentadiene is present in the reaction mass.

2. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene one of a group consisting of hydrolyzable antimony chloride-organic solvent complexes and hydrolyzable antimony bromide-organic solvent complexes, said complex being previously formed by reacting the corresponding antimony halide with an organic solvent capable of reacting with said antimony halide to form said hydrolyzable complex; and preventing the polymerization of said cyclopentadiene from being effected largely to benzene-insoluble polycyclopentadiene by thoroughly agitating the reaction mass while maintaining the reaction temperature below 45° C., the concentration of said cyclopentadiene below 50% by weight, and the proportion of catalyst to said cyclopentadiene between 40% and 100% by weight, and by stopping the reaction by inactivating said catalyst while benzene-soluble polycyclopentadiene is the preponderant polymer present in the reaction mass.

3. A process for producing benzene-soluble polycyclopentadiene by the catalytic polymerization of cyclopentadiene in the substantial absence of all other compounds polymerizable under the conditions obtaining, comprising mixing with said cyclopentadiene in the presence of a solvent to effect said polymerization in considerable proportion to polycyclopentadiene one of a group consisting of hydrolyzable antimony chloride-organic solvent complexes and hydrolyzable antimony bromide-organic solvent complexes, said complex being previously formed by reacting the corresponding antimony halide with an organic solvent capable of reacting with said antimony halide to form said hydrolyzable complex; and preventing the polymerization of said cyclopentadiene from being effected entirely to benzene-insoluble polycyclopentadiene by thoroughly agitating the reaction mass while maintaining the reaction temperature between −40° and 30° C., the concentration of said cyclopentadiene below 50% by weight, and the proportion of catalyst to said cyclopentadiene below 100% by weight, and by stopping the reaction by inactivating said catalyst while benzene-soluble polycyclopentadiene is present in the reaction mass.

SAMUEL G. TREPP.